(12) United States Patent
Song et al.

(10) Patent No.: US 9,261,088 B2
(45) Date of Patent: Feb. 16, 2016

(54) LINEAR COMPRESSOR

(75) Inventors: Ki Wook Song, Gimhae-shi (KR); Jong Yoon Choi, Gimhae-shi (KR); Cheal Lak Choi, Gimhae-shi (KR)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 13/813,704

(22) PCT Filed: Aug. 5, 2010

(86) PCT No.: PCT/KR2010/005154
§ 371 (c)(1),
(2), (4) Date: Feb. 1, 2013

(87) PCT Pub. No.: WO2012/018148
PCT Pub. Date: Feb. 9, 2012

(65) Prior Publication Data
US 2013/0129540 A1    May 23, 2013

(51) Int. Cl.
| | |
|---|---|
| F04B 35/04 | (2006.01) |
| H02K 1/34 | (2006.01) |
| H02K 33/02 | (2006.01) |
| H02K 16/04 | (2006.01) |
| F04B 39/00 | (2006.01) |
| H02K 33/06 | (2006.01) |

(Continued)

(52) U.S. Cl.
CPC ............ *F04B 35/045* (2013.01); *F04B 35/04* (2013.01); *F04B 39/0005* (2013.01); *H02K 1/34* (2013.01); *H02K 16/04* (2013.01); *H02K 33/02* (2013.01); *H02K 33/06* (2013.01); *H02K 33/16* (2013.01); *F04B 17/04* (2013.01)

(58) Field of Classification Search
CPC ........ F04B 35/045; F04B 35/04; F04B 17/04; H02K 16/04; H02K 33/18; H02K 33/16; H02K 1/34; H02K 33/00; H02K 33/02
See application file for complete search history.

(56) References Cited

U.S. PATENT DOCUMENTS

| 4,827,163 A * | 5/1989 | Bhate et al. ..................... 310/15 |
| 6,326,706 B1 | 12/2001 | Zhang ............................. 310/12 |

(Continued)

FOREIGN PATENT DOCUMENTS

| CN | 1200789 A | 12/1998 |
| CN | 1276049 A | 12/2000 |

(Continued)

OTHER PUBLICATIONS

Korean Office Action dated Dec. 16, 2014, issued in Application No. 10-2009-0051017.

(Continued)

*Primary Examiner* — Bryan Lettman
(74) *Attorney, Agent, or Firm* — Ked & Associates LLP

(57) ABSTRACT

A linear compressor can prevent leakage of a magnetic force by changing the construction of a linear motor. As the construction of the linear motor is changed, a mechanical spring constant is set smaller in consideration of a magnetic spring constant, so that the size of springs supporting a piston in the reciprocal linear motion direction can be reduced and components supporting the springs can be removed. Therefore, the linear compressor achieves a small size/a light weight. With the characteristics of the linear motor construction, the linear compressor can suppress a stroke spreading influence and easily expand a compression capacity according to a load.

14 Claims, 5 Drawing Sheets

(51) Int. Cl.
  *H02K 33/16*  (2006.01)
  *F04B 17/04*  (2006.01)

(56) References Cited

U.S. PATENT DOCUMENTS

| | | | |
|---|---|---|---|
| 8,496,453 B2 | 7/2013 | Kang et al. | 417/417 |
| 2003/0173836 A1 | 9/2003 | Inagaki et al. | 310/14 |
| 2009/0252623 A1* | 10/2009 | Choi | H02K 33/02 417/416 |
| 2010/0007224 A1* | 1/2010 | Manubolu | F02M 47/027 310/14 |

FOREIGN PATENT DOCUMENTS

| | | | |
|---|---|---|---|
| CN | 1531627 A | 9/2004 | |
| CN | 1858445 A | 11/2006 | |
| EP | 1 450 472 A1 | 8/2004 | |
| JP | 2002-034224 | 1/2002 | |
| JP | 2002-034225 | 1/2002 | |
| JP | 2004-056972 A | 2/2004 | |
| JP | 2004056972 * | 2/2004 | H02K 33/16 |
| KR | 10-0212653 B1 | 8/1999 | |
| KR | 10-2006-0072248 | 6/2006 | |
| KR | 10-0615798 | 8/2006 | |
| KR | 10-2007-0075904 | 7/2007 | |
| KR | 10-2007-0075905 | 7/2007 | |
| KR | 10-2008-0063662 | 7/2008 | |
| WO | WO 99/18649 A1 | 4/1999 | |
| WO | WO 99/28685 A1 | 6/1999 | |
| WO | WO 2006/049510 A2 | 5/2006 | |
| WO | WO 2009/054637 A1 | 4/2009 | |
| WO | WO2009/546370 * | 4/2009 | F04B 17/04 |

OTHER PUBLICATIONS

International Preliminary Report on Patentability issued in PCT Application No. PCT/KR2010/005154 dated May 19, 2011. (translation).
European Search Report dated Aug. 20, 2014, issued in Application No. 10855661.4.
Chinese Office Action dated Sep. 2, 2014, issued in Application No. 201080067991.5 (with English translation).
International Search Report issued in PCT Application No. PCT/KR2010/005154 dated May 19, 2011.

* cited by examiner

LINEAR COMPRESSOR

TECHNICAL FIELD

The present invention relates to a linear compressor which can not only meet requirements such as a low compression capacity and a small installation space but also can ensure high efficiency, and a linear motor applied to the linear compressor, and more particularly, to a linear compressor which can not only prevent leakage of a magnetic force but also can employ a magnetic spring constant, and a linear motor applied to the linear compressor.

BACKGROUND ART

In general, a reciprocal compressor is configured such that a compression space into/from which an operating gas is sucked and discharged is defined between a piston and a cylinder and that the piston is linearly reciprocated in the cylinder to compress refrigerant.

Recently, since the conventional reciprocal compressor includes components such as a crank shaft, etc. to convert a rotation force of a driving motor into a reciprocal linear motion force of the piston, a problem such as a significant mechanical loss occurs due to the motion conversion. A linear compressor has been actively developed to solve this problem.

In this linear compressor, particularly, a piston is connected directly to a linear motor performing reciprocal linear motion, thus eliminating a mechanical loss caused by the motion conversion, improving compression efficiency, and simplifying the construction. In addition, since the operation of the linear compressor can be controlled by adjusting power input to the linear motor, the linear compressor generates less noise than the other compressors, so that it is often applied to electric home appliances such as refrigerators, etc. which are used indoors.

FIG. 1 is a top sectional view illustrating an example of a conventional linear compressor, and FIG. 2 is a side sectional view illustrating part of an example of a linear motor applied to the conventional linear compressor.

As illustrated in FIG. 1, the conventional linear compressor is configured such that a structure body composed of a frame 2, a cylinder 3, a piston 4, a suction valve 5, a discharge valve assembly 6, a motor cover 7, a supporter 8, a back cover 9, a muffler assembly 10, eight springs 20, and a linear motor 30 is elastically supported in a hermetic container 1. Of course, a suction pipe 1a through which refrigerant is sucked and a discharge pipe 1b through which compressed refrigerant is discharged are provided in the hermetic container 1.

The springs 20 are provided to elastically support the piston 4 in the axial direction, wherein four first springs 21 are installed between the motor cover 7 and the supporter 8 and four second springs 22 are installed between the supporter 8 and the back cover 9. Therefore, when the piston 4 moves in the direction of compressing refrigerant, the first springs 21 are compressed to elastically support the piston 4, but when the piston 4 moves in the direction of sucking refrigerant, the second springs 22 are compressed to elastically support the piston 4.

As illustrated in FIGS. 1 and 2, the linear motor 30 is configured such that an air gap is maintained between an inner stator 31 and an outer stator 32 and that a permanent magnet 33 is interposed therebetween to be able to perform reciprocal linear motion. The permanent magnet 33 is connected to the piston 4 by a connection member 34, thereby reciprocally driving the piston 4. The inner stator 31 is formed in a cylindrical shape by stacking laminations in the circumferential direction. Here, one axial end of the inner stator 31 is brought into contact with one surface of the frame 2, and the other axial end of the inner stator 31 is fixed to an outer circumferential surface of the cylinder 3 by a fixing ring (not shown). The outer stator 32 is configured such that a plurality of cores 32B and 32B' are coupled to a coil winding body 32A at given intervals in the circumferential direction. The core 32B and 32B' is composed of a pair of blocks 32B and 32B' and installed to surround the outer circumferential surface of the coil winding body 32A in the axial direction of the coil winding body 32A. The core 32B and 32B' is provided with a pair of poles 32a and 32b to surround part of the inner circumferential surface of the coil winding body 32A. Of course, the outer stator 32 is installed maintaining the air gap from the outer circumferential surface of the inner stator 31. The outer stator 32 is disposed to be in contact with the frame 2 and the motor cover 7 in the axial direction, and then fixed as the motor cover 7 is bolt-fastened to the frame 2. The permanent magnet 33 has N-S poles. The permanent magnet 33 is provided such that the (N-S) poles are positioned on its face opposite to the inner stator 31 and its face opposite to the outer stator 32, respectively, and connected to the piston 4 by the connection member 34. Accordingly, the permanent magnet 33 performs reciprocal linear motion due to a mutual electromagnetic force between the inner stator 31, the outer stator 32, and the permanent magnet 33, thereby operating the piston 4.

Therefore, since the moving member composed of the piston 4 and the permanent magnet 33 is supported by the mechanical springs 20 on both sides of the linear motion direction relative to the fixed member composed of the cylinder 3 and the stators 31 and 32, if the M-K resonant frequency is calculated that is defined by the mass M of the moving member and the spring constant K of the springs supporting the moving member and the power frequency applied to the linear motor 32 is set to conform to the M-K resonant frequency, efficiency of the linear compressor can be optimized.

The operation of the conventional linear compressor with the above construction will be described in detail.

When power is input to the coil winding body 32A, N/S poles are alternately formed on the inner stator 31 and the outer stator 32, and the permanent magnet 33 interposed therebetween performs reciprocal linear motion due to the attractive or repulsive force according to pole changes of the inner stator 31 and the outer stator 32. Here, if the center of the permanent magnet 33 escapes from the ends of the two poles 32a and 32b of the outer stator 32, the attractive force does not reach the permanent magnet 33 or the external diffusion of the electromagnetic field increases, so that the permanent magnet 33 may be separated from between the inner stator 31 and the outer stator 32 or the externally-diffused electromagnetic field may magnetize the hermetic container 1 or the other components in the hermetic container 1, which leads to low operation reliability. In order to solve the above problem, the stroke of the piston 4, i.e., the moving distance of the permanent magnet 33 is strictly limited such that the center of the permanent magnet 33 moves between the ends of the two poles 32a and 32b of the outer stator 32. For this purpose, as illustrated in FIG. 1, a few mechanical springs 20 made of high-rigidity spring steel are used to elastically support the moving member.

When the linear motor 30 operates as described above, the piston 4 and the muffler assembly 10 connected thereto perform reciprocal linear motion, and, as the pressure of the compression space P varies, the suction valve 5 and the discharge valve assembly 6 perform operation. In this operation, refrigerant is sucked into the compression space P via the suction pipe 1a of the hermetic container 1, an opening portion of the back cover 9, the muffler assembly 10, and an inlet port of the piston 4, compressed in the compression space P, and discharged to the outside through the discharge valve assembly 6, a loop pipe (not shown), and the discharge pipe 1b of the hermetic container 1.

The recent linear compressor has been developed to be easily installed in a small space as well as to be easily applied to a low capacity. However, the conventional linear compressor and the linear motor applied thereto are not suitable for the low-capacity simple construction because the stroke length of the piston 4 is strictly limited to the distance in which the center of the permanent magnet 33 performs reciprocal linear motion between the two poles 32a and 32b of the outer stator 32 due to the aforementioned reasons and a few springs 20 are used for this purpose.

DISCLOSURE OF THE INVENTION

An object of the present invention is to provide a linear compressor which can achieve a light weight or a small size by integrating or removing components, by changing the construction of a linear motor.

Another object of the present invention is to provide a linear motor which realizes integration of components and a light weight or a small size.

A further object of the present invention is to provide a linear compressor which can optimize efficiency using a magnetic spring constant, by changing the construction of a linear motor, and a linear motor applied to the linear compressor.

According to an aspect of the present invention for achieving the above objects, there is provided a linear compressor, including: a fixed member including a cylinder having a compression space defined therein, an inner stator installed on the outside of the cylinder, and an outer stator forming a pole in an air gap from the inner stator; and a moving member including a piston performing reciprocal linear motion into the compression space of the cylinder and compressing an operating fluid introduced into the compression space and a permanent magnet performing reciprocal linear motion with the piston due to a mutual electromagnetic force in the air gap between the inner stator and the outer stator, wherein the permanent magnet is arranged in a plural number along the direction of performing reciprocal linear motion, and N pole and S pole of each permanent magnet are formed opposite to the inner stator and the outer stator.

Preferably, the plurality of permanent magnets arranged along the direction of performing reciprocal linear motion may be arranged such that different poles come in contact with each other.

Otherwise, the plurality of permanent magnets arranged along the direction of performing reciprocal linear motion may be arranged such that different poles adjoin each other.

In addition, the linear compressor includes mechanical springs elastically supporting the moving member relative to the fixing member on both sides of the reciprocal linear motion direction, wherein, as the center of the one or more permanent magnets becomes distant from the center of the pole of the outer stator in the direction of performing reciprocal linear motion, an electromagnetic restoring force may operate in the same direction as a restoring force of the compressed mechanical spring between the inner stator and the outer stator and the one or more permanent magnets.

Here, a magnetic spring constant $K_{magnet}$ compatible with a mechanical spring constant $K_{mechanical}$ may be obtained from the maximum electromagnetic restoring force operating in the same direction as the restoring force of the compressed mechanical spring between the inner stator and the outer stator and the one or more permanent magnets.

In this case, a resonant frequency $f_0$ may be obtained from the mass M of the moving member, the mechanical spring constant $K_{mechanical}$ obtained by the restoring force of the mechanical spring, a gas spring constant $K_{gas}$ defined by the pressure of the operating fluid introduced into the compression space, and the magnetic spring constant $K_{magnet}$.

In this situation, preferably, the magnetic spring constant $K_{magnet}$ is proportional to a motor characteristic value α calculated by a magnetic flux density B and a coil length l, and the stroke S of the moving member is inversely proportional to the motor characteristic value α and proportional to the magnetic spring constant $K_{magnet}$ at the same time.

Additionally, it is preferable that the inner stator and the outer stator should be provided to contact each other on one side and have one pole on the other side.

Moreover, the inner stator is mounted lengthwise on the outer circumferential surface of the cylinder in the reciprocal linear motion direction, the outer stator is disposed on the outer circumferential surface of the inner stator and provided with a connection portion connected to one axial end of the inner stator and a pole maintaining an air gap space from the other axial end of the inner stator, and the permanent magnets are disposed between the inner stator and the pole of the outer stator to be able to perform reciprocal linear motion due to a mutual electromagnetic force.

In addition, the linear compressor may further include a frame integrated with the cylinder, the connection part of the inner stator and the outer stator being supported on the frame in the reciprocal linear motion direction.

Furthermore, the linear compressor may further include a motor cover supporting the outer stator in the axial direction and bolt-fastening the outer stator to the frame, wherein the inner stator is preferably fixed by the outer stator.

In this case, the mechanical springs may be a first spring and a second spring supporting the piston on both sides of the reciprocal linear motion direction.

Still furthermore, the linear compressor may further include a back cover provided maintaining an interval from the piston in the axial direction, wherein the first spring may be installed between a flange of the piston and the back cover, and the second spring may be installed between the cylinder and the flange of the piston.

According to another aspect of the present invention, there is provided a linear compressor, including: a fixed member including a cylinder having a compression space defined therein, an inner stator installed on the outside of the cylinder, and an outer stator coming in contact with the inner stator on one side and forming a pole in an air gap on the other side; a moving member including a piston performing reciprocal linear motion into the compression space of the cylinder and compressing an operating fluid introduced into the compression space and a permanent magnet unit performing reciprocal linear motion with the piston due to a mutual electromagnetic force in the air gap between the inner stator and the outer stator, a plurality of permanent magnets being arranged therein along the direction of performing reciprocal linear motion such that different poles are brought into contact with each other and that N pole and S pole of each permanent magnet are opposite to the inner stator and the outer stator; and mechanical springs elastically supporting the moving member relative to the fixing member on both sides of the reciprocal linear motion direction, wherein, as the center of the one or more permanent magnets becomes distant from the center of the pole of the outer stator in the direction of performing reciprocal linear motion, an electromagnetic restoring force operates in the same direction as a restoring force of the compressed mechanical spring between the inner stator and the outer stator and the one or more permanent magnets.

Here, a magnetic spring constant $K_{magnet}$ compatible with a mechanical spring constant $K_{mechanical}$ may be obtained from the maximum electromagnetic restoring force operating in the same direction as the restoring force of the compressed mechanical spring between the inner stator and the outer stator and the one or more permanent magnets, the magnetic spring constant $K_{magnet}$ may be proportional to a motor characteristic value α calculated by a magnetic flux density B and a coil length l, and the stroke S of the moving member may be inversely proportional to the motor characteristic value α and proportional to the magnetic spring constant $K_{magnet}$ at the same time.

The linear motor with the above construction according to the present invention is configured such that the two permanent magnets connected in the motion direction perform reciprocal linear motion between the inner stator and one pole of the outer stator, thereby not only increasing the magnetic spring constant but also decreasing the moving distance of the permanent magnets. In the compressor employing the linear motor, as the resonant frequency is set in consideration of the magnetic spring constant $K_{magnet}$, the mechanical spring constant $K_{mechanical}$ can be set low, so that only two springs are sufficient to support the piston. Therefore, since the two springs directly elastically support the piston, the supporter can be removed or the shape of the motor cover can be simplified, so that the linear compressor has advantages such as a low capacity, light weight, and small size.

Moreover, in the linear compressor according to the present invention, as the construction of the linear motor is changed, the magnetic spring constant $K_{magnet}$ as well as the mechanical spring constant $K_{mechanical}$ and the gas spring constant $K_{gas}$ are taken into consideration in the total spring constant k. Since the cooling capacity is decided by the magnetic spring constant $K_{magnet}$ and the motor characteristic value α, the magnetic spring constant $K_{magnet}$ can offset the influence of the motor characteristic value α, such that the linear compressor has an advantage of reducing the stroke S spreading which controls the cooling capacity.

Additionally, in the linear compressor according to the present invention, since the electromagnetic force is produced only in one pole of the stator, the more the stroke S increases, the more sharply the motor characteristic value α and the magnetic spring constant $K_{magnet}$ decrease. If the slip amount Δx of the piston is generated due to the influence of the gas spring constant $K_{gas}$ according to a load and so the stroke S increases, the magnetic spring constant $K_{magnet}$ decreases, and thus the total spring constant k decreases. As a result, the slip amount Δx of the piston increases, and thus the total stroke S increases, so that the linear compressor has an advantage of easily expanding the compression capacity according to the load.

BRIEF DESCRIPTION OF THE DRAWINGS

The above and other objects, features and advantages of the present invention will become apparent from the following description of a preferred embodiment given in conjunction with the accompanying drawings, in which.

BEST MODE FOR CARRYING OUT THE INVENTION

Hereinafter, preferred embodiments of a linear compressor according to the present invention will be described in detail with reference to the accompanying drawings.

Figure 1:
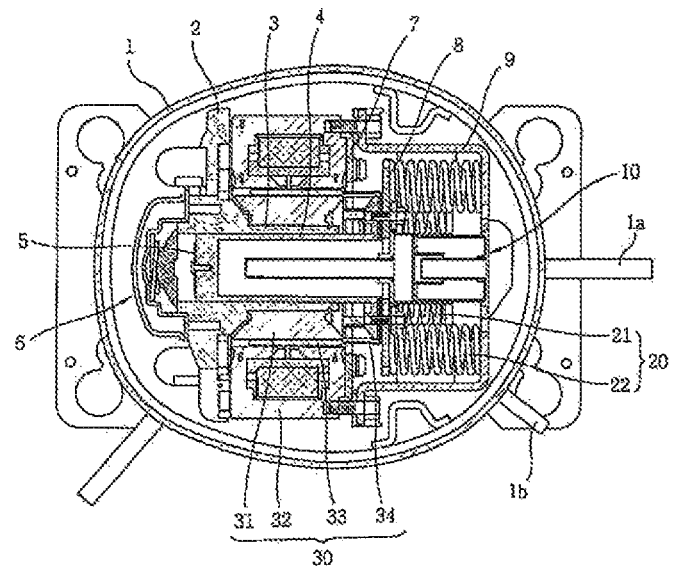
FIG. 1 is a top sectional view illustrating an example of a conventional linear compressor.
Figure 2:
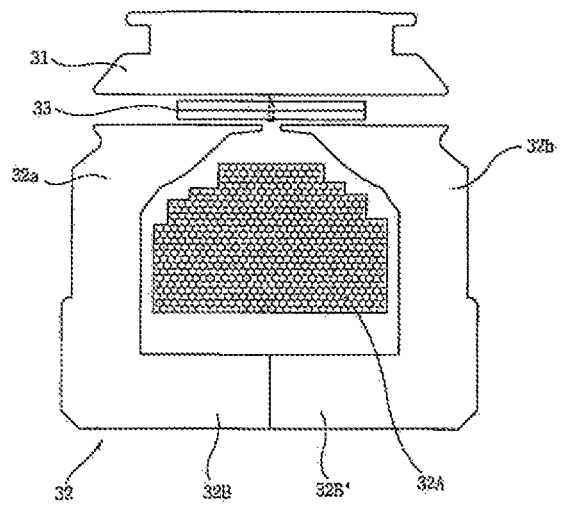
FIG. 2 is a side sectional view illustrating part of an example of a linear motor applied to the conventional linear compressor.
Figure 3:
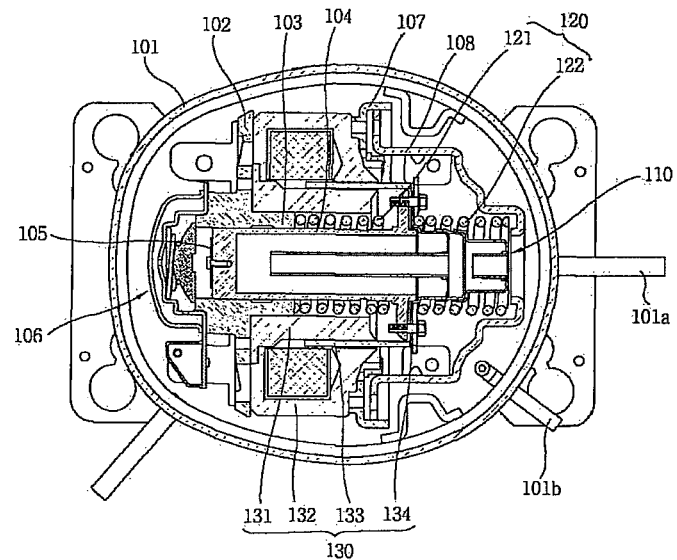
FIG. 3 is a top sectional view illustrating an example of a linear compressor according to the present invention.
Figure 4:
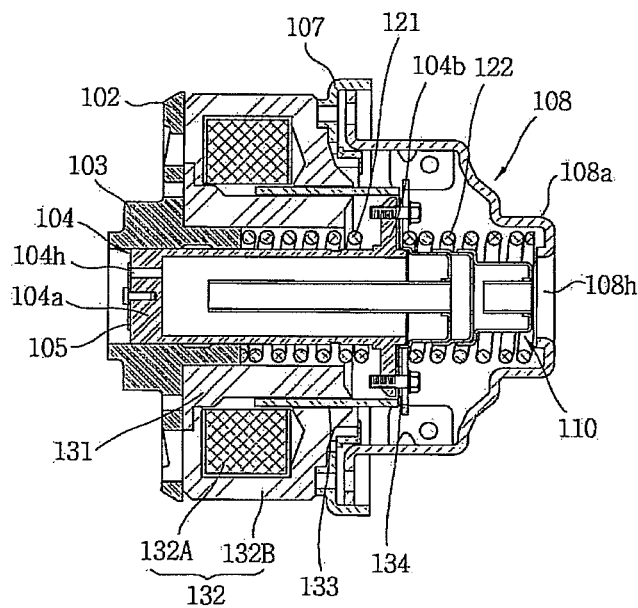
FIG. 4 is a side sectional view illustrating an example of a structure body of the linear compressor according to the present invention.

FIG. 3 is a top sectional view illustrating an example of the linear compressor according to the present invention, and FIG. 4 is a side sectional view illustrating an example of a structure body of the linear compressor according to the present invention.

As illustrated in FIGS. 3 and 4, the linear compressor according to the present invention is configured such that a structure body composed of a frame 102, a cylinder 103, a piston 104, a suction valve 105, a discharge valve assembly 106, a motor cover 107, a back cover 108, a suction muffler 110, two springs 120 (121 and 122), and a linear motor 130 is elastically supported in a hermetic container 101 provided with a suction pipe 101a and a discharge pipe 101b through which refrigerant is sucked and discharged.

The frame 102 and the cylinder 103 are manufactured in an integral type and may be made of a magnetic material with the characteristics of the linear motor 130 according to the present invention. That is, in the conventional linear compressor, as described above, two poles were present in the linear motor. Since the magnetic flux was continuously leaked through the air gap defined on the cylinder-side pole, magnetizing the frame, one or more of the frame, the cylinder, and the piston should be inevitably made of a non-magnetic substance, such as Al. However, in the linear motor 130 according to the present invention, as discussed later, an inner stator 131 and an outer stator 132 of the linear motor 130 come in contact with each other on the frame 102 and cylinder 103-side, thereby forming a closed loop. Accordingly, there is no possibility for the magnetic flux to be leaked to the outside, and thus there is no need for the frame 102 or the cylinder 103 to be made of a non-magnetic substance. The frame 102 and the cylinder 103 can be integrally casted using cast iron, etc.

The cylinder 103 is formed in a cylindrical shape with a compression space P therein. Since the stroke length of the piston 104 is short as compared with the conventional linear compressor, the cylinder 103 is shorter in the axial direction than the conventional cylinder and also shorter than the axial length of the stators 131 and 132 of the linear motor 130, which will be described below.

The piston 104 includes a head portion 104a provided at one closed end of the cylindrical shape and provided with an inlet port 104h through which refrigerant is sucked into the compression space P and a flange portion 104b formed at the other open end of the cylindrical shape to expand in the radial direction. Some part of the piston 104 may be made of a non-magnetic material to prevent leakage of a magnetic force of the linear motor 130. As discussed later, the reason for this is because a pole is present in the linear motor 130 according to the present invention toward the flange portion 104b of the piston 104 and the magnetic flux leaked through an air gap of the pole magnetizes an adjacent magnetic substance member. Here, the head portion 104a of the piston 104 is inserted into the cylinder 103, and the flange portion 104b of the piston 104 is connected to a magnet unit 133 of the linear motor 130 described below and elastically supported by two springs 120 (121 and 122) in the axial direction at the same time.

Of course, the suction valve 105 is mounted at the head portion 104a of the piston 104, and the discharge valve assembly 106 is mounted at one end of the compression space P of the cylinder 103, which are operated to be open or closed according to pressure changes of the compression space P.

The motor cover 107 fixes the linear motor 103 described below to the frame 102. One axial end of the linear motor 130 is supported on the frame 102, the other axial end of the linear motor 130 is covered with the motor cover 107, and then the motor cover 107 is bolt-fastened to the frame 102. Here, the outer stator 132 of the linear motor 130 is actually fixed between the frame 102 and the motor cover 107. While the outer stator 132 of the linear motor 130 is fixed, the inner stator 131 can be fixed together. An example of this configuration will be described below in detail.

The back cover 108 is formed by bending a flat plate to be able to accommodate the flange portion 104b of the piston 104 and the suction muffler 110 and bolt-fastened to the motor cover 107 such that its front end is positioned in the opposite direction to the linear motor 130. An additional cap 108a protrudes from the rear of the back cover 108 so that the spring 122 can be seated thereon. An additional stopper may be provided to prepare for the vibration of the structure body. However, it is preferable that the cap 108a of the back cover 108 should be formed in a circular shape or its edge portions should be rounded to serve as a stopper upon collision against the hermetic container 101. Of course, it is preferable that an opening portion 108h through which refrigerant can flow into the suction muffler 110 is provided in the cap 108a of the back cover 108 and positioned on the straight line with the suction pipe 101a of the hermetic container 101.

The suction muffler 110 is fixed to the flange portion 104b of the piston 104 and provided with various soundproof spaces and soundproof pipes to guide refrigerant to be sucked into the head portion 104a of the piston 104 and to attenuate opening/closing noises of the suction valve 105 at the same time. Of course, the whole or some part of the suction muffler 110 may also be made of a non-magnetic material to prevent leakage of a magnetic force of the linear motor 130.

The springs 120 are composed of a first spring 121 supported on the end portion of the cylinder 103 and the flange portion 104b of the piston 104 and a second spring 122 supported on the flange portion 104b of the piston 104 and the cap 108b of the back cover 108. While the first spring 121 is compressed when the piston 104 moves in the direction of compressing refrigerant, the second spring 122 is compressed when the piston 104 moves in the direction of sucking refrigerant. The first and second springs 121 and 122 behave in opposite ways. In the linear motor 130 which will be described below, unlike the conventional linear motor, a magnetic spring constant $K_{magnet}$ is significant, so that a mechanical spring constant $K_{mechanical}$ can be set relatively small. It is thus possible to make a design to reduce the spring constant of the entire springs, i.e., to reduce the number of the entire springs, or to reduce the spring constant of the individual spring, i.e., to reduce the diameter D, wire diameter d, and length l of the individual spring. Accordingly, only two springs 120 (121 and 122) can be applied, and furthermore a supporter provided to effectively position many springs in the prior art can be removed, or a spring supporting portion provided on the motor cover can be removed, which brings about a light-weight small-size compressor.

Figure 5:
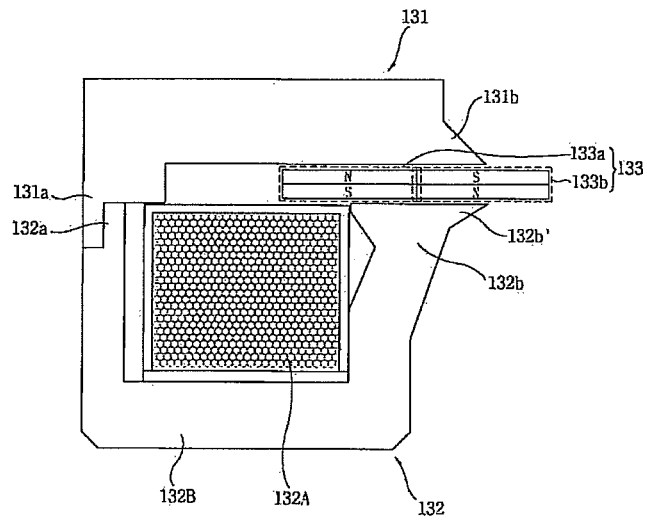
FIG. 5 is a side sectional view illustrating part of an example of a linear motor applied to the linear compressor according to the present invention.
Figure 6:
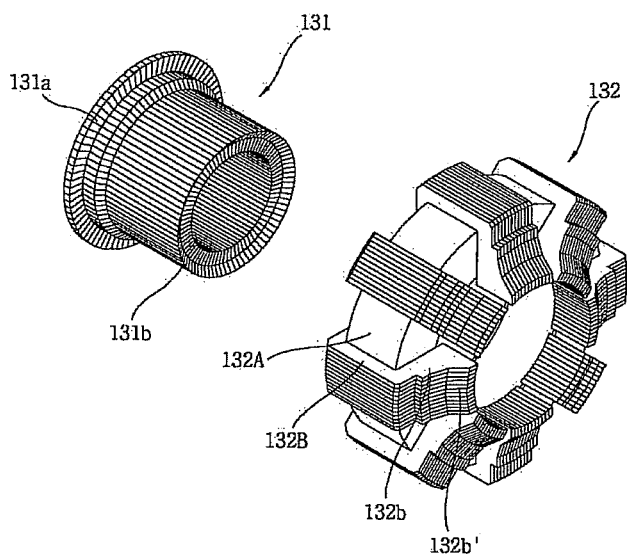
FIG. 6 is a perspective view illustrating an example of an inner stator and an outer stator applied to the linear compressor according to the present invention.

FIG. 5 is a side sectional view illustrating part of an example of the linear motor applied to the linear compressor according to the present invention, and FIG. 6 is a perspective view illustrating an example of the inner stator and the outer stator applied to the linear compressor according to the present invention.

As illustrated in FIGS. 5 and 6, the example of the linear motor applied to the linear compressor according to the present invention is configured such that one axial ends of the inner stator 131 and the outer stator 132 are connected to each other and the other portions thereof maintain an air gap from each other and that the magnet unit 133 is disposed in the air gap between the inner stator 131 and the outer stator 132 to be able to perform reciprocal linear motion due to a mutual electromagnetic force.

The inner stator 131 may be manufactured by stacking laminations in the circumferential direction as in the prior art. A connection portion 131a expanded in the radial direction is provided on the outer circumferential surface of one axial end of the inner stator 131, through which the inner stator 131 can be connected to the outer stator 132, and a protruding portion 131b expanded in the axial direction is provided on the outer circumferential surface of the other axial end of the inner stator 131 to increase the electromagnetic force. Here, since the inner stator 131 is formed longer than the axial length of the cylinder 103 (see FIG. 4), it is difficult for the inner stator 131 to be fixed to the outer circumferential surface of the cylinder 103 as in the prior art. To solve this problem, the inner stator 131 is fixed by the outer stator 132, which will be described below in detail.

The outer stator 132 includes a coil winding body 132A formed by winding coils in the circumferential direction and a plurality of cores 132B disposed at given intervals in the circumferential direction of the coil winding body 132A to surround the portions other than the inner circumferential surface of the coil winding body 132A. The core 132B is formed by stacking laminations having a '⌐'-shaped side section partially in the circumferential direction. Here, the core 132B has two end portions positioned opposite to the connection portion 131a and the protruding portion 131b of the inner stator 131. A connection portion 132a protruding in the inner stator 131-direction to overlap with the connection portion 131a of the inner stator 131 is provided at one end portion of the core 132B, and a pole 132b defining an air gap from the outer circumferential surface and the protruding portion 131b of the inner stator 131 is provided at the other end portion of the core 132B. Moreover, the connection portion 132a of the core 132B is shape-matched or welded to the connection portion 131a of the inner stator 131, or provided to press the inner stator 131 by a fastening force operating in the axial direction. Regardless of the connection manner, one end portions of the inner stator 131 and the outer stator 132 are connected to each other to form a closed loop, so that there is no possibility for a magnetic flux to be leaked through the connection part between the stators 131 and 132. It is preferable that a protruding portion 132b' expanded in both axial directions to increase the area of the face opposite to the inner stator 131 should be provided at the pole 132b of the core 132B to improve the electromagnetic force like the protruding portion 131b of the inner stator 131.

Of course, two poles were provided on the core applied to the conventional outer stator, and the area of the poles opposite to the inner stator was expanded in the axial direction to improve the electromagnetic force. In order to couple the core having these poles to the coil winding body, two core blocks were formed by stacking laminations having '⌊' and '⌋'-shaped side sections, respectively, and then coupled to the coil winding body by means of complicated coupling members and methods. However, the core 132B applied to the outer stator 132 according to the present invention has only one pole 132b, so that one core block can be formed by stacking laminations having a '⌂'-shaped side section and coupled directly to the coil winding body 132A, thus simplifying the manufacturing process.

The magnet unit 133 is composed of first and second permanent magnets 133a and 133b having N-S poles opposite to the inner stator 131 and the outer stator 132. It is preferable that the first and second permanent magnets 133a and 133b should be arranged such that different poles contact or adjoin each other in the axial direction, i.e., in the reciprocal linear motion direction. That is, since the one ends of the inner stator 131 and the outer stator 132 are connected to each other in the axial direction, the electromagnetic force is produced only between the inner stator 131 and the pole 132b of the outer stator 132, and the poles are changed only in the one pole 132b of the outer stator 132. In order for the magnet unit 133 to perform reciprocal linear motion in this situation, the magnet unit 133 itself is configured such that two permanent magnets 133a and 133b are connected to each other in the axial direction preferably with different poles in contact.

Of course, so as to manufacture the linear motor 130 with a magnetic spring constant $K_{magnet}$ as described below, the magnet unit 133 interposed between the inner stator 131 and the pole 132b of the outer stator 132 may be constructed in various forms by adjusting the arrangement and number of the permanent magnets. As an example, for each of the first and second permanent magnets 133a and 133b, eight permanent magnets are arranged at given intervals in the circumferential direction. Eight first permanent magnets 133a and eight second permanent magnets 133b may be provided such that different poles are brought into contact in the axial direction, or even if eight first permanent magnets 133a and eight second permanent magnets 133b are arranged in the axial direction, the second permanent magnets 133b may be disposed between the first permanent magnets 133a such that different poles adjoin each other. Additionally, the magnet unit 133 may further include permanent magnets arranged in the axial direction in addition to the first and second permanent magnets 133a and 133b.

Hereinafter, the coupling process of the linear motor with the above construction will be described in detail with reference to FIGS. 4 to 6.

The inner stator 131 is fitted onto the outer circumferential surface of the cylinder 103. One axial end of the inner stator 131 is coupled to be in contact with the frame 102, and then the outer stator 132 is fitted onto the outer circumferential surface of the inner stator 131. The connection portion 132a of the outer stator 132 overlaps with the connection portion 131a of the inner stator 131, and the pole 132b of the outer stator 132 is coupled maintaining an air gap from the outer circumferential surface of the inner stator 131. The motor cover 107 is coupled in the axial direction, disposed to cover the outer circumferential surface of one axial end of the outer stator 132, and then bolt-fastened to the frame 102. Of course, the bolt passes through the space between the cores 132B of the outer stator 132 to couple the frame 102 and the motor cover 107. The outer stator 132 is fixed between the frame 102 and the motor cover 107, and the inner stator 131 is easily fixed in a manner that the connection portion 132a of the outer stator 132 presses the connection portion 131a of the inner stator 131 to the frame 102 by the fastening force operating on the outer stator 132.

As can be seen, the inner stator 131 and the outer stator 132 are connected to each other to form a closed loop. Even if the inner stator 131 and the outer stator 132 come in contact with the frame 102, there is no possibility for the magnetic force to be leaked to the frame 102, and thus there is no need to for the frame 102 and the cylinder 103 to be manufactured by means of injection molding using a non-magnetic substance such as Al. They can be easily integrally formed by means of casting using a magnetic material, e.g. cast iron.

Figure 7:
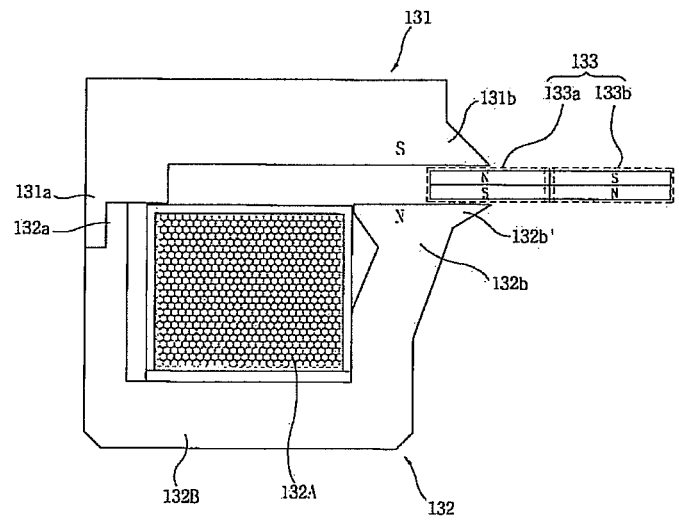
FIGS. 7 and 8 are views illustrating an example of the operation of the linear motor applied to the linear compressor according to the present invention.
Figure 8:
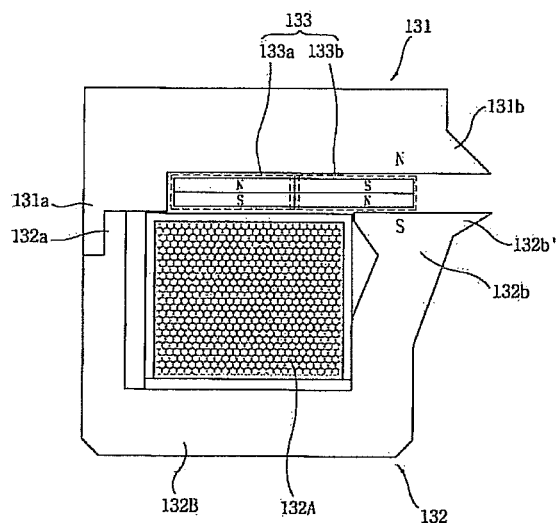

FIGS. 7 and 8 are views illustrating an example of the operation of the linear motor applied to the linear compressor according to the present invention.

As illustrated in FIGS. 7 and 8, when power is input to the coil winding body 132A, the inner stator 131 and the pole 132b of the outer stator 132 alternately have N-S poles. Therefore, as illustrated in FIG. 7, when the pole 132b of the outer stator 132 has N pole, it attracts S pole of the magnet unit 133 and repulses N pole of the magnet unit 133 at the same time (likewise, the inner stator 131 has S pole, so attracts N pole of the magnet unit 133 and repulses S pole of the magnet unit 133), thus pushing the second permanent magnet 133b to the right in addition to the restoring force of the first spring 121. Thus, the magnet unit 133 moves in one axial direction (to the right of FIG. 7) to the extent (BDC) that the center of the first permanent magnet 133a does not escape from the end of the outside protruding portion 132b' of the outer stator 132. As a result, the second permanent magnet 133b escapes from the end of the outside protruding portion 132b' of the outer stator 132, and thus completely escapes from the air gap space between the inner stator 131 and the pole 132b of the outer stator 132. On the contrary, as illustrated in FIG. 8, when the pole 132b of the outer stator 132 has S pole, it attracts N pole of the magnet unit 133 and repulses S pole of the magnet unit 133 at the same time (likewise, the inner stator 131 has N pole, so attracts S pole of the magnet unit 133 and repulses N pole of the magnet unit 133), thus pushing the first permanent magnet 133a to the left in addition to the restoring force of the second spring 122. Accordingly, in the same manner, the magnet unit 133 moves in the opposite direction (to the left) to the extent (TDC) that the center of the second permanent magnet 133b does not escape from the end of the inside protruding portion 132b' of the outer stator 132. As a result, the first permanent magnet 133a escapes from the end of the inside protruding portion 132b' of the outer stator 132, and thus completely escapes from the air gap space between the inner stator 131 and the pole 132b of the outer stator 132. That is, the moving distance of the magnet unit 133, i.e., the stroke of the piston 104 may be regarded as a distance between a point where the center of the first permanent magnet 133a is positioned at the end of the outside protruding portion 132b' of the outer stator 132 to a point where the center of the second permanent magnet 133b is positioned at the end of the inside protruding portion 132b' of the outer stator 132.

However, in the linear motor according to the present invention as described above, while the magnet unit 133 provided with the permanent magnets 133a and 133b performs reciprocal linear motion, a further restoring force operates on the magnet unit 133 of the linear motor. As illustrated in FIGS. 7 and 8, when one permanent magnet of the magnet unit 133 passes between the protruding portion 131b of the inner stator 131 and the pole 132b of the outer stator 132, it escapes from the center of the pole 132b of the outer stator 132 having a different pole. Here, an electromagnetic restoring force operates such that the permanent magnet returns to the center of the pole 132b of the outer stator 132 using the electromagnetic force. That is, while the restoring force operates that makes the first permanent magnet 133a positioned between the inner stator 131 and the pole 132b of the outer stator 132 in FIG. 7, the restoring force operates that makes the second permanent magnet 133b positioned between the inner stator 131 and the pole 132b of the outer stator 132 in FIG. 8.

This electromagnetic restoring force operates in the same direction as the restoring force of the springs 120 (121 and 122) supporting the moving member composed of the piston 104 and the magnet unit 133, and thus is defined as a magnet spring in the present invention, and a spring constant obtained from the magnet spring is represented as a magnet spring constant $K_{magnet}$. This magnet spring constant $K_{magnet}$ is expressed in the same units as a mechanical spring constant $K_{mechanical}$ elastically supporting the moving member on both sides of the reciprocal linear motion direction and compatible therewith anytime. The restoring force becomes the maximum when the center of one permanent magnet of the magnet unit 133 reaches from the center of the pole 132b of the outer stator 132 having a different pole to the end of the pole 132b of the outer stator 132, and then sharply decreases. That is, while the restoring force (electromagnetic restoring force) of the magnetic spring in the same direction as the restoring force of the second spring 122 becomes the maximum when the center of the first permanent magnet 133a is positioned at the end of the outside protruding portion 132b' of the outer stator 132 (as in FIG. 7), the restoring force (electromagnetic restoring force) of the magnetic spring in the same direction as the restoring force of the first spring 121 becomes the maximum when the center of the second permanent magnet 133b is positioned at the end of the inside protruding portion 132b' of the outer stator 132 (as in FIG. 8). The magnetic spring constant can be obtained from the electromagnetic restoring force (maximum electromagnetic restoring force) in the above positions.

Therefore, in the linear compressor employing the linear motor according to the present invention, as the magnetic spring constant $K_{magnet}$ is taken into consideration, the mechanical spring constant $K_{mechanical}$ can be set relatively small, so that there is an advantage that can reduce the rigidity of the springs (including the number, diameter, length, wire diameter, etc. of the springs). In more detail, for the purpose of the most efficient operation, the linear compressor is designed such that a power frequency f conforms to a resonant frequency $f_o$. With the characteristics of the linear motor of the present invention, upon the design of the linear compressor of the present invention, it is preferable to make a resonance design in consideration of the magnetic spring constant $K_{magnet}$ as expressed in the following formula:

$$f_o = \frac{1}{2\pi} \sqrt{\frac{K_{mechanical} + K_{gas} + K_{magnet}}{M}} \quad \text{Formula 1}$$

That is, when the power frequency f to be supplied to the linear motor is decided, the mass M of the moving member including the piston and the permanent magnet, the mechanical spring constant $K_{mechanical}$ defined by the restoring force of the mechanical springs supporting the piston on both sides of the axial direction, the gas spring constant $K_{gas}$ defined by the pressure of the gas sucked into the compression space, and the magnetic spring constant $K_{magnet}$ defined by the restoring force operating when the center of the permanent magnet escapes from the pole center of the stator as described above can be controlled such that the power frequency f conforms to the resonance point. Here, while the mass M of the moving member can be regarded as a constant determined for each product, the gas spring constant $K_{gas}$ is changed according to the refrigerant kind and load. For the resonance design, it is necessary to make a special effort so that the gas spring value can operate as a constant within the operating range. For this purpose, the mass M of the moving member is increased to reduce the influence of the gas spring, or the rigidity of the mechanical spring is increased to reduce the relative influence of the gas spring. A plurality of mechanical springs must be inevitably connected in parallel to improve their rigidity, which increases the volume of the compressor and requires a separate supporting structure such as a piston supporter for supporting the plurality of mechanical springs in parallel. However, according to the present invention, since the magnetic spring providing the restoring force in the same direction as the mechanical spring is taken into account in addition to the mechanical spring, the rigidity of the mechanical spring or the mechanical spring constant can be relatively reduced. Therefore, the number n, diameter D, wire diameter d, and length l of the springs supporting the piston, which performs reciprocal linear motion, in both axial directions can be set smaller, and the components supporting the springs can be removed, which leads to a light weight and a small size.

Moreover, the linear compressor employing the linear motor according to the present invention serves to suppress the stroke spreading influence. That is, the magnetic spring constant $K_{magnet}$ is proportional to the motor characteristic value α ($K_{magnet} \propto α$). The stroke spreading influence brought by the motor characteristic value α dependent upon each compressor model can be reduced using this relationship. In more detail, first, the cooling capacity is proportional to the stroke S (cooling capacity $\propto$ S), and the characteristic value of the linear motor expressed as α is a value that can be calculated by a magnet flux density B and a coil length l in a counter electromotive force. The magnet flux density B and the coil length l may be different according to models of linear motors, and thus each model has a unique motor characteristic value α. Meanwhile, while the motor characteristic value α is proportional to the magnetic spring ($K_{magnet} \propto α$), the stroke S is inversely proportional to the motor characteristic value α ($S \propto 1/α$) and proportional to the magnetic spring ($S \propto K_{magnet}$).

That is, in a linear compressor employing a linear motor having a large motor characteristic value α, even if the stroke S decreases due to the relatively large motor characteristic value α, the relatively large motor characteristic value α brings about a relatively large magnetic spring constant, which leads to a relatively large stroke S. Therefore, the decrease of the stroke S caused by the relatively large magnitude of the motor characteristic value α is offset by the increase of the stroke S caused by the increase of the magnetic spring constant, thus minimizing the stroke spreading influence brought by the motor characteristic value dependent upon the models of the linear motors and the resulting cooling capacity spreading influence.

Otherwise, in a linear compressor employing a linear motor having a small motor characteristic value α, even if the stroke S increases due to the relatively small motor characteristic value α, the relatively small motor characteristic value α brings about a relatively small magnetic spring constant, which also leads to a relatively small stroke S. Accordingly, the increase of the stroke S caused by the relatively small magnitude of the motor characteristic value α is offset by the decrease of the stroke S caused by the decrease of the magnetic spring constant, thus minimizing the stroke spreading influence brought by the motor characteristic value dependent upon the models of the linear motors and the resulting cooling capacity spreading influence.

Figure 9:
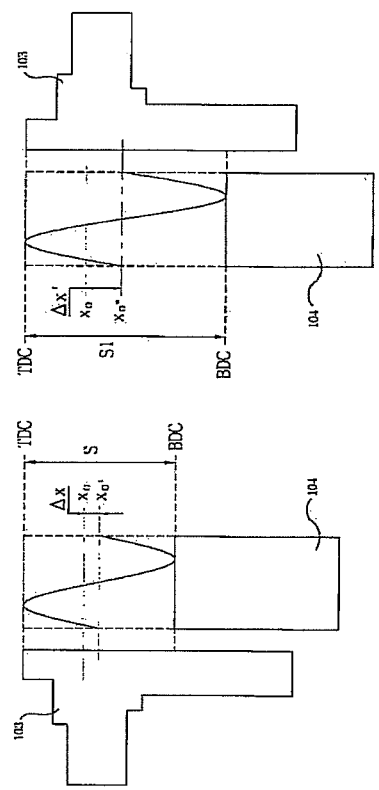
FIG. 9 is a graph showing the comparison of the original position, slip amount, top dead center (TDC), and bottom dead center (BDC) of the piston between the inventive linear compressor and the conventional linear compressor.

Furthermore, in the linear motor of the present invention, as compared with the prior art, the rigidity of the mechanical spring is reduced, so that the influence of the operating gas spring may be relatively increased according to a load. At the same time, the capacity can be easily expanded according to the load. In more detail, while the electromagnetic force is produced in two poles of the stator in the conventional linear motor, it is produced in only one pole of the stator in the inventive linear motor. As compared with the conventional linear motor, in the inventive linear motor, the more the stroke S increases, the more sharply the magnetic flux density B decreases. As such, the motor characteristic value α influenced by the magnetic flux density B also decreases. That is, in the linear compressor employing the linear motor according to the present invention, the more the stroke S increases, the more sensitively the motor characteristic value α decreases. In one linear motor, the motor characteristic value α and the magnetic spring constant $K_{magnet}$ are proportional as described above. That is, in the prior art shown on the left of the FIG. 9, when refrigerant is introduced into the compression space, the original position $x_o$ of the piston 104 is slip by the gas spring in the BDC direction by a given slip amount Δx. The piston 104 performs reciprocal linear motion in the stroke S between the TDC and the BDC based on its slip original position $x_o'$. Since it is not influenced by the magnetic spring, the stroke S is defined only by the mechanical spring and the gas spring. On the contrary, in the present invention shown on the right of FIG. 9, as mentioned above, the mechanical spring constant can be set relatively small due to the influence of the magnetic spring. When the same pressure refrigerant as the prior art shown on the left of FIG. 9 is introduced into the compression space, the magnitude of a slip amount $Δx_o'$ from the original position $x_o$ of the piston 104 increases in the BDC direction. The more the stroke S increases, the more the motor characteristic value α decreases. The magnetic spring constant $K_{magnet}$ proportional to the motor characteristic value α also decreases. The total spring constant K decreases, so that the piston 104 can perform reciprocal linear motion in a longer stroke S1 than the prior art based on its slip original position $x_o''$. As a result, the compression capacity can be more easily expanded.

The present invention has been described in detail in connection with the exemplary embodiments and the accompanying drawings. However, the scope of the present invention is not limited thereto but is defined by the appended claims.

What is claimed is:

1. A linear compressor, comprising:
a fixed member including a cylinder having a compression space defined therein, an inner stator installed at an outside of the cylinder, and an outer stator that contacts the inner stator at a first side and forms a pole in an air gap with the inner stator at a second side, wherein the outer stator is provided with a connection portion, in contact with an axial end surface of the inner stator which faces away from the air gap at a first axial end, at the first side and the pole is maintained in the air gap with a second axial end of the inner stator at the second side; and
a moving member including a piston that performs a reciprocal linear motion in the compression space of the cylinder and compresses an operating fluid introduced into the compression space, and at least one permanent magnet that performs the reciprocal linear motion with the piston due to a mutual electromagnetic force in the air gap between the inner stator and the outer stator, wherein the at least one permanent magnet includes a plurality of permanent magnets arranged along a direction of the reciprocal linear motion, and wherein N and S poles of each of the plurality of permanent magnets are formed opposite to the inner stator and the outer stator, and wherein at least one of the plurality of permanent magnets completely escapes from the air gap between the inner stator and the outer stator, during an operation of the linear compressor.

2. Ile linear compressor of claim 1, wherein the plurality of permanent magnets arranged along the direction of the reciprocal linear motion is arranged such that different poles come in contact with each other.

3. The linear compressor of claim 1, wherein the plurality of permanent magnets arranged along the direction of the reciprocal linear motion is arranged such that different poles adjoin each other.

4. The linear compressor of claim 1, further including mechanical springs that elastically support the moving member relative to the fixed member on opposite sides in the direction of the reciprocal linear motion, wherein, as a center of one or more permanent magnets of the plurality of magnets moves away from a center of the pole of the outer stator in the direction of the reciprocal linear motion, an electromagnetic restoring force operates in a same direction as a restoring force of a respective compressed mechanical spring of the mechanical springs between the inner stator and the outer stator and the one or more permanent magnets.

5. The linear compressor of claim 4, wherein a magnetic spring constant $K_{magnet}$ compatible with a mechanical spring constant $K_{mechanical}$ is obtained from a maximum electromagnetic restoring force, that operates in the same direction as the restoring force of the respective compressed mechanical spring of the mechanical springs, between the inner stator and the outer stator and the one or more permanent magnets.

6. The linear compressor of claim 5, wherein a resonant frequency $f_0$ is obtained from a mass M of the moving member, the mechanical spring constant $K_{mechanical}$ obtained by the restoring force of the respective compressed mechanical spring, a gas spring constant $K_{gas}$ defined by a pressure of the operating fluid introduced into the compression space, and the magnetic spring constant $K_{magnet}$.

7. The linear compressor of claim 4, wherein a magnetic spring constant $K_{magnet}$ is proportional to a motor characteristic value α calculated with a magnetic flux density B and a coil length l, and a stroke S of the moving member is inversely proportional to the motor characteristic value α and proportional to the magnetic spring constant $K_{magnet}$ at a same time.

8. The linear compressor of claim 4, wherein the mechanical springs include a first spring and a second spring that support the piston on the opposite sides, respectively, in the direction of the reciprocal linear motion.

9. The linear compressor of claim 8, further including a back cover that maintains an interval from the piston in an axial direction, wherein the first spring is installed between a flange of the piston and the back cover, and the second spring is installed between the cylinder and the flange of the piston.

10. The linear compressor of claim 1, wherein the inner stator is mounted lengthwise on an outer circumferential surface of the cylinder in the direction of the reciprocal linear motion, wherein the outer stator is disposed on an outer circumferential surface of the inner stator and provided with the connection portion in contact with the first axial end surface of the inner stator and wherein the plurality of permanent magnets is disposed between the inner stator and the pole of the outer stator to perform the reciprocal linear motion due to the mutual electromagnetic force.

11. The linear compressor of claim 10, further including a frame integrated with the cylinder, wherein the connection portion is supported on the frame in the direction of the reciprocal linear motion.

12. The linear compressor of claim 11, further including a motor cover that supports the outer stator in an axial direction, wherein a bolt fastens the outer stator to the frame, and wherein the inner stator is fixed by the outer stator.

13. A linear compressor, comprising:
- a fixed member including a cylinder having a compression space defined therein, an inner stator installed at an outside of the cylinder, and an outer stator that contacts the inner stator at a first side and forms a pole in an air gap with the inner stator at a second side, wherein the outer stator is provided with a connection portion, in contact with an axial end surface of the inner stator which faces away from the air gap at a first axial end, at the first side and the pole is maintained in the air gap with a second axial end of the inner stator at the second side;
- a moving member including a piston that performs a reciprocal linear motion in the compression space of the cylinder and compresses an operating fluid introduced into the compression space, a permanent magnet device that performs the reciprocal linear motion with the piston due to a mutual electromagnetic force in the air gap between the inner stator and the outer stator, wherein the permanent magnet device includes a plurality of permanent magnets arranged along a direction of the reciprocal linear motion such that different poles are brought into contact with each other and N and S poles of each permanent magnet of the plurality of permanent magnets are opposite to the inner stator and the outer stator, and wherein at least one of the plurality of permanent magnets completely escapes from the air gap between the inner stator and the outer stator, during an operation of the linear compressor; and
- mechanical springs that elastically support the moving member relative to the fixed member on opposite sides in the direction of the reciprocal linear motion, wherein, as a center of the plurality of permanent magnets moves away from a center of the pole of the outer stator in the direction of the reciprocal linear motion, an electromagnetic restoring force operates in a same direction as a restoring force of a respective compressed mechanical spring of the mechanical springs between the inner stator and the outer stator and the one or more permanent magnets.

14. The linear compressor of claim 13, wherein a magnetic spring constant $K_{magnet}$ compatible with a mechanical spring constant $K_{mechanical}$ is obtained from a maximum electromagnetic restoring force that operates in a same direction as the restoring force of the respective compressed mechanical spring of the mechanical springs, between the inner stator and the outer stator and the plurality of permanent magnets, the magnetic spring constant $K_{magnet}$ is proportional to a motor characteristic value $\alpha$ calculated with a magnetic flux density B and a coil length l, and a stroke S of the moving member is inversely proportional to the motor characteristic value $\alpha$ and proportional to the magnetic spring constant $K_{magnet}$ at a same time.

* * * * *